April 9, 1957  A. W. MORTON  2,787,932
BLIND RIVET HAVING TAPERED EXPANDER PIN THEREIN
Filed May 18, 1955
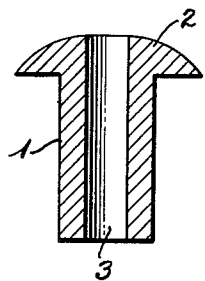
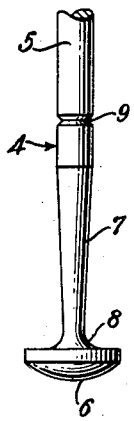
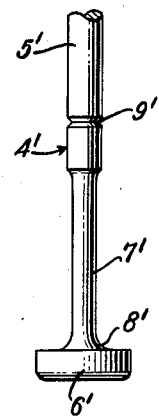
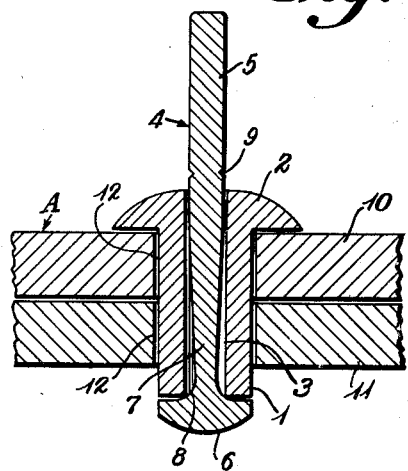
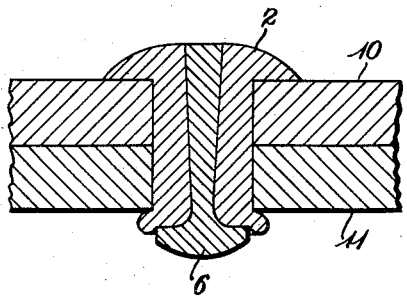
INVENTOR
*Allen W. Morton*
BY Benjamin G. Weil
ATTORNEY р
United States Patent Office 2,787,932
Patented Apr. 9, 1957

2,787,932
BLIND RIVET HAVING TAPERED EXPANDER PIN THEREIN

Allen W. Morton, Baltimore, Md., assignor to The Glenn L. Martin Company, Middle River, Md., a corporation of Maryland Application May 18, 1955, Serial No. 509,337

5 Claims. (Cl. 85—40)

This invention relates to the improved construction of a two-part rivet of the type generally referred to as a blind rivet for joining two or more members together, and is especially adapted for assemblies where the driving force can be applied only to one side of the members to be joined. A blind rivet is a very common expedient in assemblies in the aircraft industry where it is necessary to secure together portions of an assembly in which it is impossible to insert a bucking bar within the assembly to buck the rivet in the usual manner. Such a rivet has the additional advantage in other installations, in that it can be installed by one person with a relatively simple hand tool, thus eliminating the necessity of a pneumatic riveting tool and a second person to handle a bucking bar.

There are a great many different designs of blind rivets on the market and in the prior art patents, but in each design there are some inherent disadvantages.

It is an object of this invention to provide a two-piece blind rivet including a reliable self-locking pin to effect a tight seal of the sheets joined thereby. It is another object of this invention to provide a two-piece blind rivet in which the locking pin is of reduced diameter, that is, either tapered or undercut in a portion of the part engaged by the tubular rivet to afford a locking means whereby the pin will not work loose and fall out when subjected to severe vibration, such as in aircraft construction. It is another object of this invention to provide a blind rivet that will accommodate relatively wide variations of thicknesses of sheets to be joined with one size rivet.

Further and other objects will be apparent from the description of the accompanying drawings in which like numerals refer to like parts.

In the drawings,

Fig. 1 is a sectional view through a tubular rivet;

Fig. 2 is a side elevational view of the pin or plug for the tubular rivet;

Fig. 3 is a modified form of the pin or plug shown in Fig. 2;

Fig. 4 is a sectional view of an assembled rivet in place in registered holes in two members to be secured together;

Fig. 5 is a sectional view similar to Fig. 4, showing the riveting operation completed and the pin or plug located within the rivet.

The invention is illustrated in the drawings in which Fig. 1 shows a tubular rivet or bushing having a sleeve or body portion 1, and a flanged head portion 2 on one end of the body portion and a uniform hole 3 of generally constant diameter extending axially of the body portion 1.

Figs. 2 and 3 illustrate the other member of the two-piece rivet. Fig. 2 shows a pin or plug generally indicated as 4, consisting of stem portion 5 having a bead or head 6 on one end thereof. Stem portion 5 has a portion 7 adjacent head 6 which is of reduced diameter. Portion 7 is shown in Fig. 2 as being tapered between portion 5 and head 6. Portion 7' is shown in Fig. 3 as being undercut with a generally constant diameter between portion 5' and head 6'. In either case, it is desirable that portion 7 be joined to head 6 with a large radius or fillet 8 or 8' to effect the transition from the reduced diameter portion 7 to the enlarged head 6. The fillet terminates in a straight portion, near the periphery of the head, to bear against the end of the sleeve of the bushing. The large fillet 8 not only avoids a large concentration of stress in this critical area, but also is desirable as a means of forcing the material of the sleeve portion of the tubular rivet outwardly when axial force is applied to the pin or plug 4 to set or drive the rivet.

It should be noted, as shown in Fig. 4, that the stem portion 5 of pin 4 is of a diameter such that it engages hole 3 in the sleeve portion 1 of the tubular rivet with a sliding fit and that the diameter of head 6 on pin 4 is substantially equal to the outside diameter of sleeve portion 1.

The tubular rivet and the pin or plug 4 can be formed from a number of materials, such as aluminum, titanium or steel. The tubular rivet should be of relatively softer or more ductile material than pin 4. For example, the tubular rivet could be of annealed aluminum and the pin of aluminum of greater strength, or the pin can be made of steel. When a steel pin is assembled with an aluminum tubular rivet, there is danger of corrosion, due to the use of dissimilar materials, and it is advisable to treat the contiguous surfaces to prevent corrosion through electrolytic action. This can be accomplished by cadmium plating the steel pin or by applying other types of coatings well known in the art.

In either of the forms of the pin shown in Fig. 2 or 3, it should be noted that the tapered portion 7 of Fig. 2, or the undercut portion 7' of Fig. 3, is of shorter axial extent than the length of hole 3 through the tubular rivet. Although the tapered portion 7 is shown to be less than the length of the tubular rivet, it is obvious that the taper may be continued for a length equal to the length of the rivet. This ensures the pin being gripped and held firmly against displacement within the rivet when the rivet is set and later subjected to vibration.

Various configurations of head 6 or 6' can be used to meet any particular requirement. A notch or groove 9 can be provided in pin 4 or 4', as shown at 9 or 9', to facilitate cutting the pin to the proper length after the rivet is set or driven.

The members to be assembled or joined together by the rivet are shown in Fig. 4 as members 10 and 11. Members 10 and 11 are represented as two flat sheets which have been drilled or punched to form registering holes 12. Holes 12 are of proper diameter to accommodate sleeve portion 1 of the tubular rivet. The tubular rivet with pin 4 in place in hole 3 is inserted in holes 12 in sheets 10 and 11 from side A.

A tool for setting a blind rivet such as the type described above is readily available and may be of conventional design which is adapted to grip the stem of pin or plug 4 and exert an axial pull thereon, while at the same time exerting a driving force on the flanged head 2. The axial pull on pin 4 while the tubular rivet is held firmly in holes 12 of sheets 10 and 11 will cause the softer material of the tubular rivet to be deformed. Fillet 8 will cause the end of sleeve portion 1 of the tubular rivet adjacent head 6 to first flow outwardly to form a head thereon of greater diameter than holes 12. Continued axial motion or pull on pin 4 will cause the metal of sleeve portion 1 to flow axially and then radially until it has filled the space between holes 12 and the reduced diameter portion 7 of pin 4, thus locking the pin in the tubular rivet against subsequent axial displacement.

When the operation of setting the rivet by exerting a pulling force on pin 4 is completed, the rivet will appear as shown in Fig. 5, with the metal of sleeve portion 1 of the rivet shown having flowed axially and radially to lock the pin firmly in place. The portion of the pin protruding beyond the flanged head 2 of the rivet may then be clipped or sawed off, and peened or filed smooth and flush with the surface of the head of the rivet, as shown in Fig. 5. By thus driving or setting the rivet described above, an exceptionally tight seal of the rivet hole is effected and an equally tight seal of the components of the rivet itself is effected.

Rivets can be stocked for each hole diameter in an assortment of sizes, in one sixty-fourth or thirty-second of an inch increments, in diameter, depending upon the diameter of the rivets. Sheets of varying thicknesses, from a few thousandths of an inch up to one sixth-fourth of an inch, or even one thirty-second of an inch, can be held together by one rivet of sufficient length to accommodate the combined nominal thickness of the members to be joined. In other words, with the rivet of this invention, the length is not critical, but a latitude of thickness variations may be tolerated. The sleeve portion 1 of the tubular rivet must be sufficiently long to project well beyond the members to be joined, as shown in Fig. 4.

It is understood that certain changes, modifications, alterations or substitutions can be made without departing from the spirit of the appended claims.

I claim:
1. A positive locking device comprising a flanged bushing formed of ductile material, adapted for insertion in a hole through two or more members to be joined together, and a pin formed from non ductile material encased in the bushing, said pin having an enlarged head on one end with a flat inner bearing surface to contact the end of the bushing opposite from the flange, and a shaft formed with a gradual taper over substantially its entire length of contact with said bushing, said shaft being connected to said enlarged head by a fillet, the smallest portion of the tapered shaft being adjacent said enlarged head.

2. The positive locking device as defined in claim 1 in which said bushing is formed from aluminum alloy, and said pin of steel.

3. The positive locking device as defined in claim 1 in which said bushing is formed from an aluminum alloy, and said pin of titanium alloy.

4. A two-piece positive locking rivet adapted for insertion in a hole through two or more members to be joined together, comprising a hollow bushing of ductile material having a head at one end thereof and a non-ductile pin projecting through said bushing, said pin having a shank with a head on one end thereof, the latter head having a flat underside adapted to contact the end of the bushing remote from the head of the bushing, the shank of said pin gradually increasing in diameter substantially throughout its length of contact with said bushing, commencing from a point just above the head of said pin and connected thereto by a fillet, whereby when the shank of said pin is pulled with respect to the head of said bushing so as to set the rivet, the shank of said bushing will be compressed axially and because of said axial compression will be caused to flow radially outwardly to seal the hole through the members to be joined and inwardly into gripping contact with the shank of said pin, to lock said pin and bushing tightly against motion in any direction.

5. A two piece positive locking rivet comprising a hollow deformable bushing and a non-ductile pin having a shank adapted to extend through said bushing, said bushing and said pin each having heads, the head of said pin having a substantiallly flat undersurface adapted to contact the tip end of the bushing remote from the head of the bushing in a substantially parallel planar relationship, said shank of said pin gradually increasing in diameter substantially throughout its length of contact with said bushing, commencing from a point just above the head of said pin and connected thereto by a fillet, whereby when said bushing is fitted into a hole in members to be joined, and the shank of said pin is pulled with respect to the head of said bushing so as to set the rivet, the shank of said bushing will be compressed axially and because of said axial compression, will be caused to flow radially outwardly into gripping contact with the hole in the members to be joined and inwardly into gripping contact with the shank of said pin, to lock said pin and bushing tightly against movement in any direction.

References Cited in the file of this patent

UNITED STATES PATENTS

| | | |
|---|---|---|
| Re. 21,058 | Huck | Apr. 25, 1939 |
| 2,195,029 | Hathorn | Mar. 26, 1940 |
| 2,371,452 | Lees | Mar. 13, 1945 |
| 2,384,321 | Lees | Sept. 4, 1945 |
| 2,385,886 | Shaff | Oct. 2, 1945 |
| 2,538,623 | Keating | Jan. 16, 1951 |

FOREIGN PATENTS

| | | |
|---|---|---|
| 826,586 | Germany | Jan. 3, 1952 |